United States Patent
Underdal et al.

(10) Patent No.: US 8,412,402 B2
(45) Date of Patent: *Apr. 2, 2013

(54) VEHICLE STATE TRACKING METHOD AND APPARATUS FOR DIAGNOSTIC TESTING

(75) Inventors: Olav M. Underdal, Kalamazoo, MI (US); Harry M. Gilbert, Portage, MI (US); Oleksiy Portyanko, Portage, MI (US); Randy L. Mayes, Otsego, MI (US); Gregory J. Fountain, Kalamazoo, MI (US); William W. Wittliff, III, Gobles, MI (US)

(73) Assignee: SPX Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/084,253

(22) Filed: Apr. 11, 2011

(65) Prior Publication Data

US 2011/0190977 A1 Aug. 4, 2011

Related U.S. Application Data

(63) Continuation of application No. 12/651,745, filed on Jan. 4, 2010, now Pat. No. 7,925,397, which is a continuation of application No. 11/452,243, filed on Jun. 14, 2006, now Pat. No. 7,643,916.

(51) Int. Cl.
*G06F 7/00* (2006.01)
(52) U.S. Cl. ...................................... 701/29.1
(58) Field of Classification Search ............. 701/31.4, 701/31.7, 32.8, 33.4, 36, 29.1; 702/182–185
See application file for complete search history.

(56) References Cited

U.S. PATENT DOCUMENTS

| 4,404,639 A | 9/1983 | McGuire et al. |
| 4,757,463 A | 7/1988 | Ballou et al. |
| 4,796,206 A | 1/1989 | Boscove et al. |
| 4,817,092 A | 3/1989 | Denny |

(Continued)

FOREIGN PATENT DOCUMENTS

| CN | 1527934 A | 9/2004 |
| DE | 10233503 A1 | 2/2004 |

(Continued)

OTHER PUBLICATIONS

European Search Report for Appl. No. 07252442.4, dated Sep. 11, 2007.

(Continued)

*Primary Examiner* — Yonel Beaulieu
(74) *Attorney, Agent, or Firm* — Baker & Hostetler LLP

(57) ABSTRACT

A vehicle state tracker tracks the state of a vehicle during a diagnostic test sequence to eliminate redundant steps between diagnostic procedures. The vehicle state tracker maintains a list of preconditions required for each diagnostic procedure, reads a current vehicle state from a memory register and verifies the current setting of the vehicle state corresponding to a specific precondition. If the precondition is required and the current setting is not valid, the state tracker further formats a test preparation step corresponding to the precondition for display to instruct a vehicle technician to satisfy the precondition. Otherwise, if the precondition is not required and the corresponding setting is valid, the state tracker formats an instruction to reverse the corresponding vehicle condition. The state tracker additionally receives feedback indicating when a precondition has been satisfied or the corresponding vehicle condition has been reversed, and updates the vehicle state in memory.

21 Claims, 3 Drawing Sheets

U.S. PATENT DOCUMENTS

| | | |
|---|---|---|
| 4,866,635 A | 9/1989 | Kahn et al. |
| 4,873,687 A | 10/1989 | Breu |
| 4,881,230 A | 11/1989 | Clark et al. |
| 4,943,919 A | 7/1990 | Aslin et al. |
| 4,954,964 A | 9/1990 | Singh |
| 4,964,125 A | 10/1990 | Kim |
| 4,985,857 A | 1/1991 | Bajpai et al. |
| 5,010,487 A | 4/1991 | Stonehocker |
| 5,023,791 A | 6/1991 | Herzberg et al. |
| 5,025,392 A | 6/1991 | Singh |
| 5,036,479 A | 7/1991 | Prednis et al. |
| 5,099,436 A | 3/1992 | McCown et al. |
| 5,109,380 A | 4/1992 | Ogino |
| 5,111,402 A | 5/1992 | Brooks et al. |
| 5,127,005 A | 6/1992 | Oda et al. |
| 5,161,158 A | 11/1992 | Chakravarty et al. |
| 5,184,312 A | 2/1993 | Ellis |
| 5,214,577 A | 5/1993 | Sztipanovits et al. |
| 5,270,920 A | 12/1993 | Pearse et al. |
| 5,293,323 A | 3/1994 | Doskocil et al. |
| 5,396,422 A | 3/1995 | Forchert et al. |
| 5,442,549 A | 8/1995 | Larson |
| 5,491,631 A | 2/1996 | Shirane et al. |
| 5,524,078 A | 6/1996 | Kolb et al. |
| 5,541,840 A | 7/1996 | Gurne et al. |
| 5,561,762 A | 10/1996 | Smith et al. |
| 5,572,424 A | 11/1996 | Kellogg et al. |
| 5,586,252 A | 12/1996 | Barnard et al. |
| 5,617,039 A | 4/1997 | Kuck et al. |
| 5,631,831 A | 5/1997 | Bird et al. |
| 5,670,939 A | 9/1997 | Rodewald et al. |
| 5,671,141 A | 9/1997 | Smith et al. |
| 5,696,676 A | 12/1997 | Takaba |
| 5,729,452 A | 3/1998 | Smith et al. |
| 5,742,500 A | 4/1998 | Irvin |
| 5,778,381 A | 7/1998 | Sandifer |
| 5,835,871 A | 11/1998 | Smith et al. |
| 5,838,261 A | 11/1998 | Lauta et al. |
| 5,852,789 A | 12/1998 | Trsar et al. |
| 5,883,586 A | 3/1999 | Tran et al. |
| 5,916,286 A | 6/1999 | Seashore et al. |
| 5,964,811 A | 10/1999 | Ishii et al. |
| 5,964,813 A | 10/1999 | Ishii et al. |
| 5,987,443 A | 11/1999 | Nichols et al. |
| 6,003,021 A | 12/1999 | Zadik et al. |
| 6,003,808 A | 12/1999 | Nguyen et al. |
| 6,006,146 A | 12/1999 | Usui et al. |
| 6,012,152 A | 1/2000 | Douik et al. |
| 6,032,088 A | 2/2000 | Feldmann et al. |
| 6,041,287 A | 3/2000 | Dister et al. |
| 6,055,468 A | 4/2000 | Kaman et al. |
| 6,064,998 A | 5/2000 | Zabloudil et al. |
| 6,067,537 A | 5/2000 | O'Connor et al. |
| 6,067,538 A | 5/2000 | Zorba et al. |
| 6,073,127 A | 6/2000 | Lannert et al. |
| 6,085,184 A | 7/2000 | Bertrand et al. |
| 6,119,074 A | 9/2000 | Sarangapani |
| 6,122,575 A | 9/2000 | Schmidt et al. |
| 6,134,488 A | 10/2000 | Sasaki et al. |
| 6,141,608 A | 10/2000 | Rother |
| 6,167,352 A | 12/2000 | Kanevsky et al. |
| 6,175,787 B1 | 1/2001 | Breed |
| 6,192,302 B1 | 2/2001 | Giles et al. |
| 6,205,465 B1 | 3/2001 | Schoening et al. |
| 6,226,627 B1 | 5/2001 | Polak |
| 6,236,917 B1 | 5/2001 | Liebl et al. |
| 6,249,755 B1 | 6/2001 | Yemini et al. |
| 6,263,268 B1 | 7/2001 | Nathanson |
| 6,263,322 B1 | 7/2001 | Kirkevold et al. |
| 6,282,469 B1 | 8/2001 | Rogers et al. |
| 6,301,531 B1 | 10/2001 | Pierro et al. |
| 6,314,375 B1 | 11/2001 | Sasaki et al. |
| 6,330,499 B1 | 12/2001 | Chou et al. |
| 6,338,148 B1 | 1/2002 | Gillenwater et al. |
| 6,363,304 B1 | 3/2002 | Ramsey |
| 6,370,455 B1 | 4/2002 | Larson et al. |
| 6,434,455 B1 | 8/2002 | Snow et al. |
| 6,477,453 B2 | 11/2002 | Oi et al. |
| 6,493,615 B1 | 12/2002 | Johnston |
| 6,505,106 B1 | 1/2003 | Lawrence et al. |
| 6,512,968 B1 | 1/2003 | de Bellefeuille et al. |
| 6,522,987 B1 | 2/2003 | Flink et al. |
| 6,526,340 B1 | 2/2003 | Reul et al. |
| 6,526,361 B1 | 2/2003 | Jones et al. |
| 6,538,472 B1 | 3/2003 | McGee |
| 6,557,115 B2 | 4/2003 | Gillenwater et al. |
| 6,560,516 B1 | 5/2003 | Baird et al. |
| 6,574,537 B2 | 6/2003 | Kipersztok et al. |
| 6,591,182 B1 | 7/2003 | Cece et al. |
| 6,609,051 B2 | 8/2003 | Fiechter et al. |
| 6,611,740 B2 | 8/2003 | Lowrey et al. |
| 6,615,120 B1 | 9/2003 | Rothner |
| 6,636,790 B1 | 10/2003 | Lightner et al. |
| 6,640,166 B2 | 10/2003 | Liebl et al. |
| 6,643,607 B1 | 11/2003 | Chamberlain et al. |
| 6,652,169 B2 | 11/2003 | Parry |
| 6,662,087 B1 | 12/2003 | Liebl et al. |
| 6,694,235 B2 | 2/2004 | Akiyama |
| 6,708,092 B1 | 3/2004 | Starks et al. |
| 6,711,134 B1 | 3/2004 | Wichelman et al. |
| 6,714,846 B2 | 3/2004 | Trsar et al. |
| 6,738,697 B2 | 5/2004 | Breed |
| 6,748,304 B2 | 6/2004 | Felke et al. |
| 6,751,536 B1 | 6/2004 | Kipersztok et al. |
| 6,768,935 B1 | 7/2004 | Morgan et al. |
| 6,795,778 B2 | 9/2004 | Dodge et al. |
| 6,807,469 B2 | 10/2004 | Funkhouser et al. |
| 6,819,988 B2 | 11/2004 | Dietz et al. |
| 6,836,708 B2 | 12/2004 | Tripathi |
| 6,845,307 B2 | 1/2005 | Rother |
| 6,845,468 B2 | 1/2005 | James |
| 6,868,319 B2 | 3/2005 | Kipersztok et al. |
| 6,874,680 B1 | 4/2005 | Klaus et al. |
| 6,928,349 B1 | 8/2005 | Namaky et al. |
| 6,941,203 B2 | 9/2005 | Chen |
| 6,950,829 B2 | 9/2005 | Schlabach et al. |
| 6,993,421 B2 | 1/2006 | Pillar et al. |
| 7,010,460 B2 | 3/2006 | Trsar et al. |
| 7,013,411 B2 | 3/2006 | Kallela et al. |
| 7,050,894 B2 | 5/2006 | Halm et al. |
| 7,062,622 B2 | 6/2006 | Peinado |
| 7,073,120 B2 | 7/2006 | Torii et al. |
| 7,082,359 B2 | 7/2006 | Breed |
| 7,103,610 B2 | 9/2006 | Johnson et al. |
| 7,103,679 B2 | 9/2006 | Bonn |
| 7,120,559 B1 | 10/2006 | Williams et al. |
| 7,120,890 B2 | 10/2006 | Urata et al. |
| 7,124,058 B2 | 10/2006 | Namaky et al. |
| 7,142,960 B2 | 11/2006 | Grier et al. |
| 7,162,741 B2 | 1/2007 | Eskin et al. |
| 7,165,216 B2 | 1/2007 | Chidlovskii et al. |
| 7,171,372 B2 | 1/2007 | Daniel et al. |
| 7,203,881 B1 | 4/2007 | Williams et al. |
| 7,209,815 B2 | 4/2007 | Grier et al. |
| 7,209,817 B2 | 4/2007 | Abdel-Malek et al. |
| 7,209,860 B2 | 4/2007 | Trsar et al. |
| 7,216,052 B2 | 5/2007 | Fountain et al. |
| 7,251,535 B2 | 7/2007 | Farchmin et al. |
| 7,272,475 B2 | 9/2007 | Gawlik et al. |
| 7,272,756 B2 | 9/2007 | Brink et al. |
| 7,286,047 B2 | 10/2007 | Oesterling et al. |
| 7,373,225 B1 | 5/2008 | Grier et al. |
| 7,376,497 B2 | 5/2008 | Chen |
| 7,379,846 B1 | 5/2008 | Williams et al. |
| 7,400,954 B2 | 7/2008 | Sumcad et al. |
| 7,409,317 B2 | 8/2008 | Cousin et al. |
| 7,428,663 B2 | 9/2008 | Morton et al. |
| 7,430,535 B2 | 9/2008 | Dougherty et al. |
| 7,444,216 B2 | 10/2008 | Rogers et al. |
| 7,483,774 B2 | 1/2009 | Grichnik et al. |
| 7,555,376 B2 | 6/2009 | Beronja |
| 7,565,333 B2 | 7/2009 | Grichnik et al. |
| 7,610,127 B2 | 10/2009 | D'Silva et al. |
| 7,636,622 B2 | 12/2009 | Underdal et al. |
| 7,643,912 B2 | 1/2010 | Heffington |
| 7,643,916 B2 * | 1/2010 | Underdal et al. ............ 701/31.4 |
| 7,647,349 B2 | 1/2010 | Hubert et al. |

| | | |
|---|---|---|
| 7,715,961 B1 | 5/2010 | Kargupta |
| 7,739,007 B2 | 6/2010 | Logsdon |
| 7,751,955 B2 | 7/2010 | Chinnadurai et al. |
| 7,752,224 B2 | 7/2010 | Davis et al. |
| 7,761,591 B2 | 7/2010 | Graham |
| 7,765,040 B2 | 7/2010 | Underdal et al. |
| 7,778,746 B2 | 8/2010 | McLeod et al. |
| 7,788,096 B2 | 8/2010 | Chelba et al. |
| 7,809,482 B2 | 10/2010 | Bertosa et al. |
| 7,853,435 B2 | 12/2010 | Dodge et al. |
| 7,860,620 B2 | 12/2010 | Kojitani et al. |
| 7,865,278 B2 | 1/2011 | Underdal et al. |
| 7,882,394 B2 | 2/2011 | Hosek et al. |
| 7,925,397 B2 * | 4/2011 | Underdal et al. ............ 701/33.4 |
| 8,019,501 B2 | 9/2011 | Breed |
| 8,024,083 B2 | 9/2011 | Chenn |
| 8,055,907 B2 | 11/2011 | Deem et al. |
| 8,239,094 B2 | 8/2012 | Underdal et al. |
| 2002/0007237 A1 | 1/2002 | Phung et al. |
| 2002/0059075 A1 | 5/2002 | Schick et al. |
| 2002/0091736 A1 | 7/2002 | Wall |
| 2002/0112072 A1 | 8/2002 | Jain |
| 2002/0116669 A1 | 8/2002 | Jain |
| 2002/0173885 A1 | 11/2002 | Lowrey et al. |
| 2003/0177414 A1 | 9/2003 | Pillutla et al. |
| 2004/0001106 A1 | 1/2004 | Deutscher et al. |
| 2004/0039493 A1 | 2/2004 | Kaufman |
| 2004/0181688 A1 | 9/2004 | Wittkotter |
| 2005/0043868 A1 | 2/2005 | Mitcham |
| 2005/0065678 A1 | 3/2005 | Smith et al. |
| 2005/0071143 A1 | 3/2005 | Tran et al. |
| 2005/0137762 A1 | 6/2005 | Rother |
| 2005/0144183 A1 | 6/2005 | McQuown et al. |
| 2005/0177352 A1 | 8/2005 | Gravel |
| 2005/0222718 A1 | 10/2005 | Lazarz et al. |
| 2006/0030981 A1 | 2/2006 | Robb et al. |
| 2006/0074824 A1 | 4/2006 | Li |
| 2006/0095230 A1 | 5/2006 | Grier et al. |
| 2006/0129906 A1 | 6/2006 | Wall |
| 2006/0136104 A1 | 6/2006 | Brozovich et al. |
| 2006/0142907 A1 | 6/2006 | Cancilla et al. |
| 2006/0142910 A1 | 6/2006 | Grier et al. |
| 2006/0149434 A1 | 7/2006 | Bertosa et al. |
| 2006/0210141 A1 | 9/2006 | Kojitani et al. |
| 2006/0229777 A1 | 10/2006 | Hudson et al. |
| 2007/0100520 A1 | 5/2007 | Shah et al. |
| 2007/0124282 A1 | 5/2007 | Wittkotter |
| 2007/0226540 A1 | 9/2007 | Konieczny |
| 2007/0250228 A1 | 10/2007 | Reddy et al. |
| 2007/0293998 A1 | 12/2007 | Underdal et al. |
| 2007/0294001 A1 | 12/2007 | Underdal et al. |
| 2009/0216584 A1 | 8/2009 | Fountain et al. |
| 2009/0271066 A1 | 10/2009 | Underdal et al. |
| 2010/0082197 A1 | 4/2010 | Kolbet et al. |
| 2010/0262431 A1 | 10/2010 | Gilbert |

FOREIGN PATENT DOCUMENTS

| | | |
|---|---|---|
| DE | 10332203 A1 | 2/2005 |
| EP | 1674958 A1 | 6/2006 |
| GB | 2329943 | 7/1999 |
| JP | H03-087671 A | 4/1991 |
| JP | 06-256696 A1 | 9/1994 |
| JP | H08-043265 A | 2/1996 |
| JP | H10-253504 A | 9/1998 |
| JP | 2001-202125 A | 7/2001 |
| JP | 2001-229299 A | 8/2001 |
| JP | 2002-183334 A | 6/2002 |
| JP | 2004-299587 A | 10/2004 |
| JP | 2007-326425 A | 12/2007 |

OTHER PUBLICATIONS

European Search Report for Appl. No. 07252441, dated Jun. 20, 2008.
L.J. Aartman, et al., "An Independent Verification Tool for Multi-Vendor Mode S Airborne Transponder Conformance Testing," 21st Digital Avionics Systems Conference, 2002, pp. 12.E.5-1-12.E.5-11, vol. 2.
"Annex A Test Bit Sequence," Methodology for Jitter and Signal Quality; Specification—MJSQ Technical Report REV 10.0, pp. 117-132, Mar. 10, 2003.
Tariq Assaf, et al. "Automatic Generation of Diagnostic Expert Systems from Fault Trees," 2003 Proceedings Annual Reliability & Maintainability Symposium, pp. 143-147.
R. Belhassine-Cherif, et al., "Multiple Fault Diagnostics for Communicating Nondeterministic Finite State Machines," 6th IEEE Symposium on Computers and Communications, Jul. 3-5, 2001, pp. 661-666.
M. Ben-Bassat, et al., "A1-Test: A Real Life Expert System for Electronic Troubleshooting (A Description and a Case Study)," 4th Conference on Artificial Intelligence Applications, 1988, pp. 2-10.
F. Brajou, et al., "The Airbus A380—An AFDX-Based Flight Test Computer Concept," 2004 IEEE Autotestcon, pp. 460-463.
Cantone, et al., "IN-ATE: Fault Diagnosis as Expert System Guided Search," Computer Expert Systems, L. Bolc & M.J. Coombs (eds.), Springer-Verlag, New York 1986, pp. 298-348.
"Computerized Diagnostic Tester at Hand," Electrical World, Aug. 1, 1975, pp. 36-38.
T.A. Cross, "A Digital Electronic System for Automobile Testing and Diagnosis," IEE Conference Jul. 6-9, 1976, London, England, pp. 152-159.
eHow Contributor, "How to Organize Computer Files," printed Mar. 31, 2011 from http://www.ehow.com/print/how_138482_organize-computer-files.html.
F. Esposito, et al., "Machine Learning Methods for Automatically Processing Historical Documents: from Paper Acquisition to XML Transformation," 1st Int'l Workshop on Document Image Analysis for Libraries, Jan. 23-24, 2004, pp. 328-335.
H. Garcia-Molina, et al., "dSCAM: Finding Document Copies Across Multiple Databases," 4th Int'l Conference on Parallel and Distributed Information Systems, Dec. 18-20, 1996, pp. 68-79.
I. Ghosh, et al., "Automatic Test Pattern Generation for Functional Register-Transfer Level Circuits Using Assignment Decision Diagrams," IEEE Transactions on Computer-Aided Design of Integrated Circuits and Systems, vol. 20, Issue 3, Mar. 2001, pp. 402-415.
M. Koppel, et al., "Automatically Classifying Documents by Ideological and Organizational Affiliation," IEEE Int'l Conference on Intelligence and Security Informatics, Jun. 8-11, 2009, pp. 176-178.
J.C. Lin, et al., "Using Genetic Algorithms for Test Case Generation in Path Testing," 9th Asian Test Symposium, Dec. 4-6, 2000, pp. 241-246.
W. Linzhang, et al., "Generating Test Cases from UML Activity Diagram Based on Gray-Box Method," 11th Asia-Pacific Software Engineering Conference, Nov. 30-Dec. 3, 2004, pp. 1-8.
B.D. Liu, et al., "Efficient Global Strategy for Designing and Testing Scanned Sequential Circuits," IEE Proceedings on Computers and Digital Techniques, vol. 142, No. 2, Mar. 1995, pp. 170-176.
M. Mayer, "The Computerized Diagnostic Rhyme Test as a Design Tool for Armored Vehicle Intercommunications Systems," Military Communications Conference, 1985, pp. 166-170.
Microsoft at Work, "File Organization tips: 9 ideas for managing files and folders," printed Mar. 30, 2011 from http://www.microsoft.com/atwork/productivity/files.aspx.
S.M. Namburu, et al., "Systematic Data-Driven Approach to Real-Time Fault Detection and Diagnosis in Automotive Engines," 2006 IEEE Autotestcon, pp. 59-65.
"Names files and folders—How To—Web Team—University of Canterbury, New Zealand," printed on Mar. 31, 2011 from http://www.canterbury.ac.nz/web/how/filename.shtml.
D. Niggemeyer, et al., "Automatic Generation of Diagnostic March Tests," 19th IEEE Proceedings on VLSI Test Symposium, 2001, pp. 299-304.
Yiannis Papadopoulos, et al., "Automating the Failure Modes and Effects Analysis of Safety Critical Systems," Proceedings of the Eighth IEEE Int'l Symposium on High Assurance Systems Engineering (HASE '04), 2004.
F.C. Pembe, et al., "Heading-Based Sectional Hierarchy Identification for HTML Documents," 22nd Int'l Symposium on Computer and Information Sciences, Nov. 7-9, 2007, pp. 1-6.
F. Pipitone, "The FIS Electronics Troubleshooting System Guided Search," Computer Expert Systems, vol. 19, No. 7, 1986, pp. 68-76.

G. Qin, et al., "On-Board Fault Diagnosis of Automated Manual Transmission Control System," IEEE Transactions on Control Systems Technology, vol. 12, No. 4, Jul. 2004, pp. 564-568.

H.M.T. Saarikoski, "2T: Two-Term Indexing of Documents Using Syntactic and Semantic Constraints," 16th Int'l Workshop on Database and Expert Systems Applications, Aug. 22-26, 2005, pp. 1025-1028.

P. Samuel, et al., "UML Sequencing Diagram Based Testing Using Slicing," An Int'l Conference of IEEE India Council, Dec. 11-13, 2005, pp. 176-178.

F.Y. Shih, et al., "A Document Segmentation, Classification and Recognition System," 2nd Int'l Conference on Systems Integration, 1992, pp. 258-267.

Genichi Taguchi, et al., The Mahalanobis-Taguchi System. Published 2000, McGraw-Hill Professional. http://books.google.com/books?id=5AOuyyccV8kC&printsec=frontcover&sig=WdZNGINfzuveQpcYASuCMCvuiO (no hard copy, unable to print, must review on-line).

H. Trier, "Further Development of the Periodical Vehicle Test by Using Diagnostic Interface," IEE Colloquium on Vehicle Diagnostics in Europe, 1994, pp. 4/1-4/2.

J. van Beers, et al., "Test Features of a Core-Based Co-Processor Array for Video Applications," Int'l Test Conference, 1999, pp. 638-647.

J.R. Wagner, "Failure Mode Testing Tool Set for Automotive Electronic Controllers," IEEE Transactions on Vehicular Technology, vol. 43, Issue 1, Feb. 1994, pp. 156-163.

Reuben Wright, et al., "How Can Ontologies Help Repair Your Car?" XTECH 2005: XML, the Web and beyond; May 27, 2005, Amsterdam; http://ww.idealliance.org/proceedings/xtech05/papers/02-07-02/.

B. Ives et al., "After the Sale: Leveraging Maintenance with Information Technology," MIS Quarterly, vol. 12, No. 1, Mar. 1988, pp. 7-21.

"Volkswagon-Audi Vehicle Communication Software Manual," Snap-On, published Mar. 31, 2006, http://www.w124performance.com/docs/general/Snap-On/manuals/VCS_Manual_VW_Audi.pdf, XP007920392.

* cited by examiner

VEHICLE STATE TRACKING METHOD AND APPARATUS FOR DIAGNOSTIC TESTING

CROSS-REFERENCE TO RELATED APPLICATIONS

This application claims the benefit of and is a continuation of U.S. patent application Ser. No. 12/651,745, filed Jan. 4, 2010, now U.S. Pat. No. 7,925,397, which is a continuation of U.S. patent application Ser. No. 11/452,243, filed Jun. 14, 2006, now U.S. Pat. No. 7,643,916, entitled "Vehicle State Tracking Method and Apparatus for Diagnostic Testing," which are hereby incorporated by reference in its entirety.

FIELD OF THE INVENTION

The present invention relates generally to diagnostic equipment. More particularly, the present invention relates to tracking a vehicle state during a diagnostic test sequence, such as a vehicle diagnostic test sequence, for diagnostic systems.

BACKGROUND OF THE INVENTION

Diagnostic systems are used by technicians and professionals in virtually all industries to perform basic and advanced system testing functions. For example, in the automotive, trucking, heavy equipment and aircraft industries, diagnostic test systems provide for vehicle onboard computer fault or trouble code display, interactive diagnostics, multi-scope and multimeter functions, and electronic service manuals. In the medical industry, diagnostic systems provide for monitoring body functions and diagnosis of medical conditions, as well as system diagnostics to detect anomalies in the medical equipment.

In many industries, diagnostic systems play an increasingly important role in manufacturing processes, as well as in maintenance and repair throughout the lifetime of the equipment or product. Some diagnostic systems are based on personal computer technology and feature user-friendly, menu-driven diagnostic applications. These systems assist technicians and professionals at all levels in performing system diagnostics on a real-time basis.

A typical diagnostic system includes a display on which instructions for diagnostic procedures are displayed. The system also includes a system interface that allows the operator to view real-time operational feedback and diagnostic information. Thus, the operator may view, for example, vehicle engine speed in revolutions per minute, or battery voltage during start cranking; or a patient's heartbeat rate or blood pressure. With such a system, a relatively inexperienced operator may perform advanced diagnostic procedures and diagnose complex operational or medical problems.

The diagnostic procedures for diagnostic systems of this sort are typically developed by experienced technical experts or professionals. The technical expert or professional provides the technical experience and knowledge required to develop complex diagnostic procedures. Thus, the efficacy of the diagnostic procedures, in particular the sequence in which the diagnostic procedures are performed, is highly dependent on the expertise of the technical expert or professional authoring the procedures.

Some existing diagnostic systems have a disadvantage in that each diagnostic procedure in a sequence of diagnostic procedures includes test preparation steps without regard to the preceding diagnostic test procedures. As a result, when performing the diagnostic procedures, the vehicle technician may return the vehicle to a default starting configuration at the end of an individual diagnostic procedure, only to realize that the following test procedure requires one or more of the same test preparation steps. This process can result in the expenditure of unnecessary time, cost and duplication of effort. Accordingly, it is desirable to provide a method and apparatus for tracking the state of a vehicle during a sequence of diagnostic test procedures in a format that can be executed on a PC-based diagnostic system.

SUMMARY OF THE INVENTION

The foregoing needs are met, to a great extent, by the present invention, wherein in one aspect an apparatus and method are provided that in some embodiments can track the state of a vehicle during a sequence of diagnostic test procedures in a format that can be executed on a PC-based diagnostic system.

In accordance with one aspect of the present invention, a diagnostic tool for use with a diagnostic test sequence that includes a precondition determiner configured to determine if a precondition is required for a subsequent diagnostic test, a setting verifier configured to verify a current state of the precondition for the subsequent diagnostic test, and a preparatory step formatter configured to provide instructions to make the precondition ready if required for the subsequent diagnostic test if it is not ready for the subsequent diagnostic test.

In accordance with another aspect of the present invention, a computer implemented method of tracking a state of a precondition that include the steps of determining the precondition required for a subsequent diagnostic test, via a processor of the computer, determining if the required precondition is ready for the subsequent diagnostic test, via the processor, and providing instructions to a user to make the required precondition ready if it if the precondition is not ready, via the processor.

In accordance with yet another aspect of the present invention, A diagnostic tool that includes means for determining if a precondition is required for a subsequent diagnostic test, means for verifying a current state of the precondition for the subsequent diagnostic test, and means for instructing a user to make the precondition ready if required for the subsequent diagnostic test if it is not ready for the subsequent diagnostic test.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the

DETAILED DESCRIPTION

Figure 1:
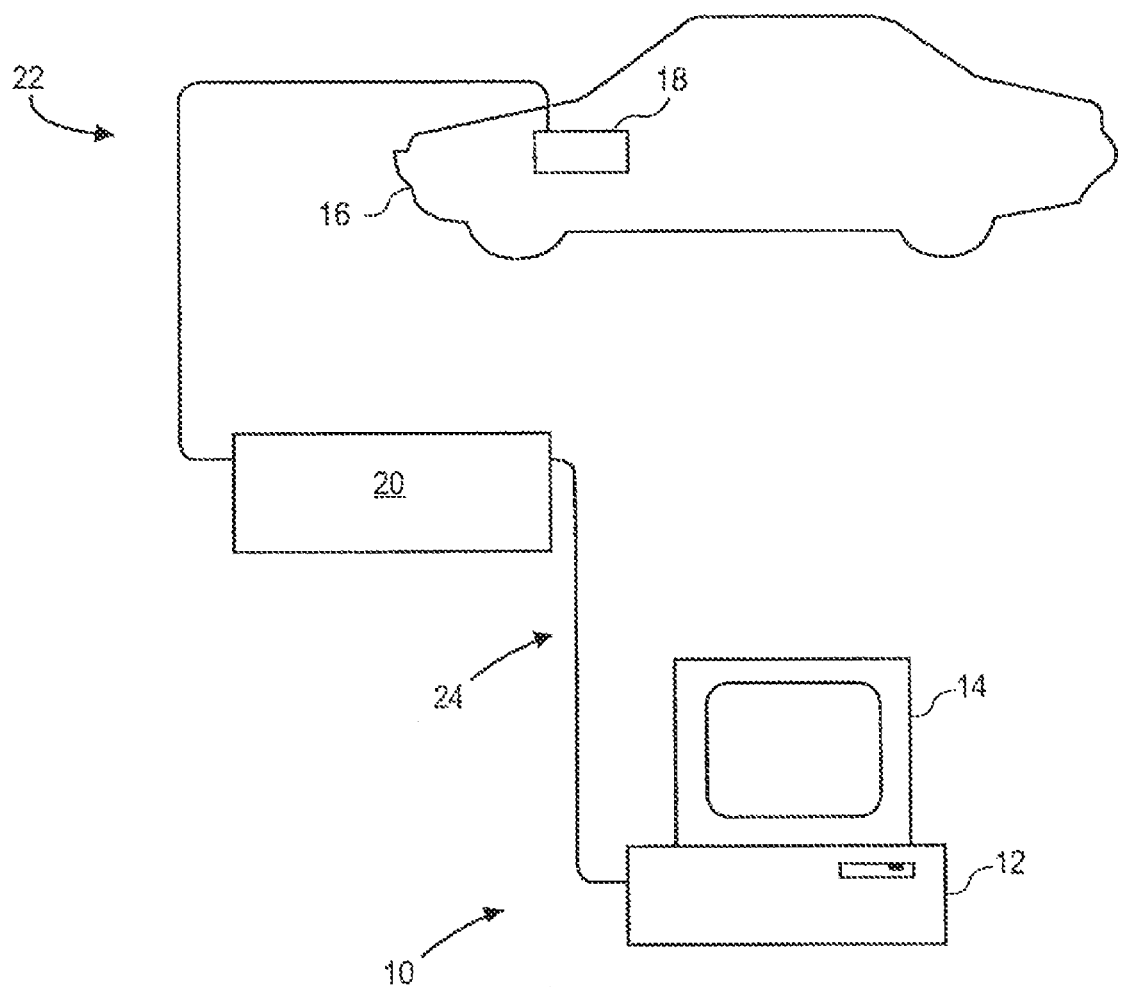
FIG. 1 illustrates an exemplary vehicle diagnostic test setup of a type suitable for carrying out the functions of an embodiment of the invention.

An embodiment of the present invention provides a vehicle state tracker that facilitates performance of vehicle diagnostic test sequences by tracking the state of the subject vehicle during and between individual diagnostic test procedures. The vehicle state tracker can help to eliminate duplication of efforts during a diagnostic test sequence by keeping track of the current vehicle test configuration and providing test preparation steps to reconfigure the vehicle between individual diagnostic procedures without redundant steps. The vehicle state tracker can track the current state of the vehicle by maintaining a current list of preconditions, or vehicle test configuration information.

The vehicle state tracker can include a precondition determiner that can determine the preconditions required for a subsequent diagnostic procedure, a state reader that can read a current state, for example, from a memory register, and a setting verifier than can verify the current setting of the vehicle state with regard to an individual precondition required for the diagnostic procedure. The vehicle state tracker can also include a test prep step formatter that can format a test preparation step related to a required precondition for display on a display device, if the precondition is required for the test procedure and the current setting of the vehicle state corresponding to the precondition is not valid. The vehicle state tracker can further include a feedback receiver that can receive feedback from a user, the vehicle or test equipment indicating that the required precondition has been satisfied, and a state updater that can update the vehicle state, for example, in a memory register, to reflect the status of the precondition.

Similarly, the vehicle state tracker can determine a vehicle condition that is not required for the subsequent diagnostic procedure, verify the current setting of the vehicle state with regard to the condition, and format a test preparation step that instructs the vehicle technician to reverse the condition, if the condition is not required for the subsequent test procedure and the current setting is valid.

The terms "valid" and "invalid" as used in this disclosure regarding the vehicle state settings corresponding to preconditions describe the vehicle state setting. As used in this disclosure, the term "valid" means that the current setting indicates that the precondition is set, indicating that the precondition is currently met or the corresponding vehicle test configuration is currently set up. Correspondingly, the terms "invalid" or "not valid" as used in this disclosure mean that the current vehicle state setting is not set, indicating that the corresponding precondition is not currently met or that the corresponding vehicle test configuration is not currently set up.

An embodiment of the vehicle state tracker can complement or can be an integral part of a diagnostic test procedure generator. An example of a diagnostic test procedure generator that is compatible with the interactive diagnostic schematic generator is disclosed in copending U.S. patent application, entitled "Diagnostic Decision Sequencing Method and Apparatus for Optimizing a Diagnostic Test Plan," filed concurrently herewith by Fountain, et al., the disclosure of which is hereby incorporated by reference in its entirety.

The invention will now be described with reference to the drawing figures, in which like reference numerals refer to like parts throughout. FIG. 1 illustrates a vehicle test configuration that is compatible with the present inventive method and apparatus. A vehicle state tracker 10 can include a personal computer 12 with a display device 14. The vehicle state tracker 10 can be coupled to a vehicle 16, including, for example, a vehicle onboard computer 18. For example, the vehicle state tracker 10 can be coupled to the vehicle onboard computer 18 by way of a vehicle interface box 20, as shown in FIG. 1. The vehicle test configuration can further include electrical links 22, 24, such as wires, cables, data buses, a communication network or a wireless network. The vehicle state tracker 10 can display diagnostic test procedure instructions to a vehicle technician to aid in performing vehicle diagnostics. The vehicle state tracker 10 can also receive feedback from the vehicle 16.

Figure 2:
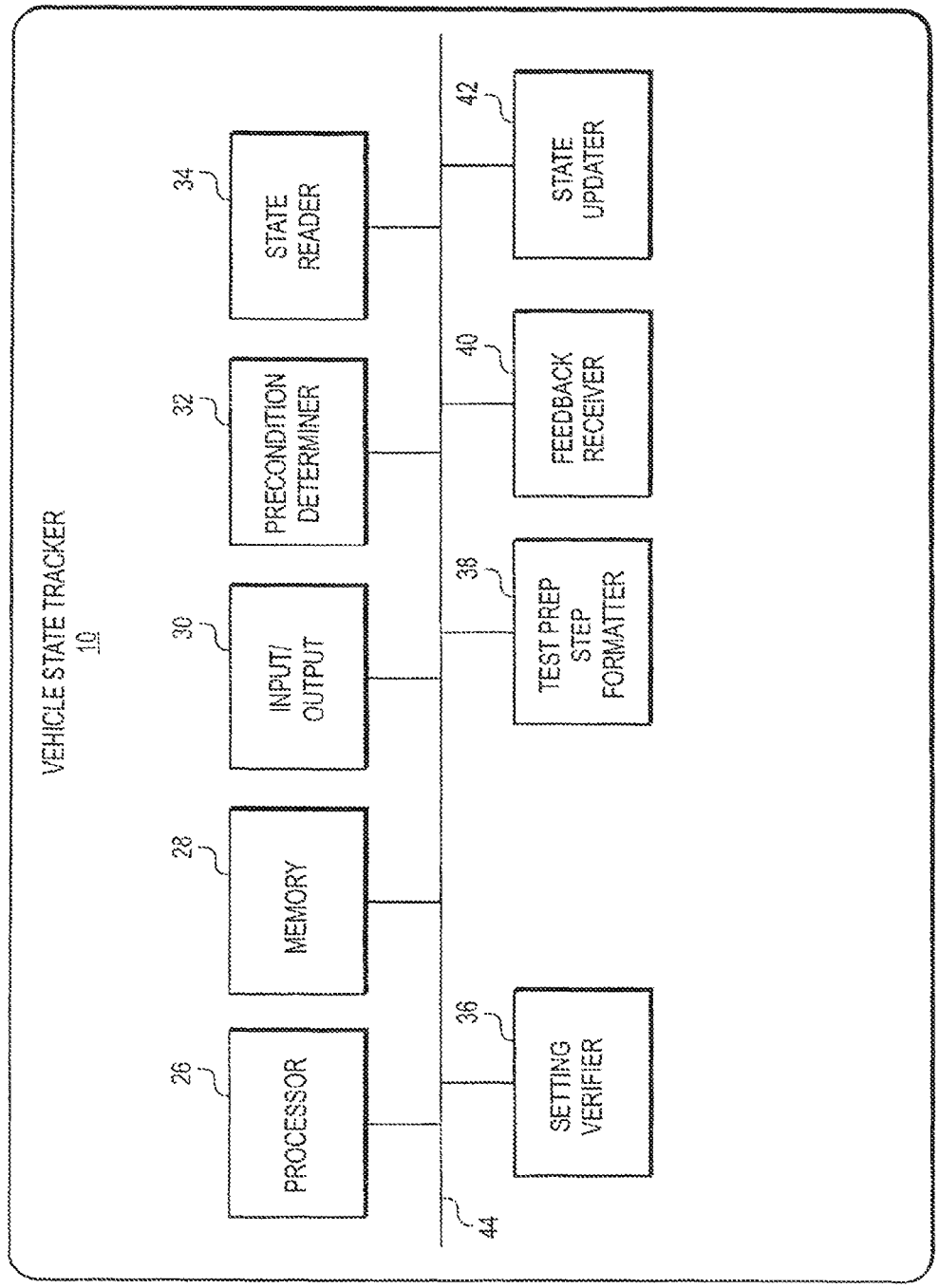
FIG. 2 is a schematic diagram illustrating a vehicle state tracker according to a preferred embodiment of the invention.

As illustrated in FIG. 2, a vehicle state tracker 10 can include a processor 26, a memory 28, an input/output device 30, a precondition determiner 32, a state reader 34, a setting verifier 36, a test preparation step formatter 38, a feedback receiver 40, and a state updater 42, all of which can be interconnected by a data link 44. The processor 12, the memory 14, the input/output device 16 and the display device 34 can be part of a general computer, such as a personal computer (PC), a UNIX workstation, a server, a mainframe computer, a personal digital assistant (PDA), or some combination of these. Alternatively, the processor 12, the memory 14 and the input/output device 16 can be part of a specialized computing device, such as a vehicle diagnostics scan tool. The remaining components can include programming code, such as source code, object code or executable code, stored on a computer-readable medium that can be loaded into the memory 14 and processed by the processor 12 in order to perform the desired functions of the vehicle state tracker 10.

In various embodiments, the vehicle state tracker 10 can be coupled to a communication network, which can include any viable combination of devices and systems capable of linking computer-based systems, such as the Internet; an intranet or extranet; a local area network (LAN); a wide area network (WAN); a direct cable connection; a private network; a public network; an Ethernet-based system; a token ring; a value-added network; a telephony-based system, including, for example, T1 or E1 devices; an Asynchronous Transfer Mode (ATM) network; a wired system; a wireless system; an optical system; a combination of any number of distributed processing networks or systems or the like.

An embodiment of the vehicle state tracker 10 can be coupled to the communication network by way of the local data link, which in various embodiments can incorporate any combination of devices—as well as any associated software or firmware—configured to couple processor-based systems, such as modems, network interface cards, serial buses, parallel buses, LAN or WAN interfaces, wireless or optical interfaces and the like, along with any associated transmission protocols, as may be desired or required by the design.

Additionally, an embodiment of the vehicle state tracker 10 can communicate information to the user and request user input by way of an interactive, menu-driven, visual display-based user interface, or graphical user interface (GUI). The user interface can be executed, for example, on a personal computer (PC) with a mouse and keyboard, with which the user may interactively input information using direct manipulation of the GUI. Direct manipulation can include the use of a pointing device, such as a mouse or a stylus, to select from a variety of selectable fields, including selectable menus, drop-down menus, tabs, buttons, bullets, checkboxes, text boxes, and the like. Nevertheless, various embodiments of the invention may incorporate any number of additional functional user interface schemes in place of this interface scheme, with or without the use of a mouse or buttons or keys, including for example, a trackball, a touch screen or a voice-activated system.

The precondition determiner 32 can determine a set of preconditions, or vehicle test configuration requirements, necessary for an individual diagnostic test procedure. Preconditions and corresponding test preparation steps can be created, or authored, for example, by an expert diagnostics technician. Preconditions can also be formatted to be reusable in various diagnostic test procedures, which can save time during the authoring phase of diagnostic test procedures. In operation, the precondition determiner 32 typically can determine the preconditions required for a subsequent diagnostic test procedure before the completion of a current diagnostic test procedure in order to prevent or minimize redundant efforts at the completion of the current diagnostic procedure and at the initiation of the subsequent diagnostic procedure.

The state reader 34 can read a current state of the vehicle, for example, from a memory register. In some embodiments, the vehicle state can be stored in a processor register, while in other embodiments the vehicle state can be stored in a main memory register or in a memory register of a storage device associated with the personal computer 12. The setting verifier 36 can verify a current setting of the vehicle state with regard to a specific precondition, or a group of current settings corresponding to a number of preconditions.

Regarding a precondition that is required for the subsequent test procedure, if the corresponding vehicle state setting is currently not valid, the test preparation step formatter 38 can format a test preparation step for display on the display device 14 to instruct the vehicle technician to set up the required precondition or vehicle test configuration. Of course, if the precondition is required for the subsequent test procedure and the corresponding vehicle state setting is currently valid, the test preparation step formatter 38 may elect not to format a test preparation step for display.

Thus, the test preparation step can be displayed to the vehicle technician to instruct the technician to satisfy a required precondition for the diagnostic procedure. Correspondingly, if the precondition was required for the current diagnostic procedure and as also required for the subsequent diagnostic procedure, the vehicle diagnostic system does not instruct the vehicle technician to perform redundant vehicle test configuration setup labor. As a result, the vehicle state tracker 10 can help eliminate repetitive steps, facilitating a faster and more accurate diagnosis of a vehicle operational problem.

In addition, the vehicle state tracker 10 can include a feedback receiver 40 that can receive feedback indicating when the precondition has been satisfied. For example, the feedback receiver 40 can receive a data signal from the vehicle onboard computer 18 indicating that the precondition has been satisfied. Similarly, the feedback receiver 40 can receive a feedback signal from test equipment, such as a digital multimeter, coupled to the vehicle 16. Otherwise, the feedback receiver 40 can receive user input from the vehicle technician by way of the input/output device 30 indicating that the precondition has been satisfied, or that the vehicle technician has complied with the test preparation step instructions.

Once the precondition has been satisfied, the state updater 42 can update the vehicle state, for example, in a memory register, to reflect a valid setting corresponding to the precondition. Thus, the vehicle state can be continuously updated to maintain a current and accurate vehicle state that is available to the diagnostic system at any time in order to determine test preparation steps required to reconfigure the vehicle 16 between diagnostic procedures in a diagnostic test sequence.

In the case that the vehicle condition is currently valid but is not required for a subsequent test procedure, the test preparation step formatter 38 can format a test preparation step for display instructing the vehicle technician to reverse, or undo, the vehicle condition. Correspondingly, the feedback receiver 40 can receive feedback as described above indicating that the condition has been reversed, and the state updater 42 can update the vehicle state, for example, in a memory register, to reflect an invalid setting corresponding to the condition, or precondition.

The vehicle state tracker 10 can maintain vehicle state settings for any number of vehicle preconditions associated with the diagnostic test procedures. For example, preconditions can include the following:
- an ignition switch position
- an engine run condition
- a throttle position
- an engine speed
- a vehicle speed
- a test equipment connection
- a vehicle electrical connection condition
- an ambient air temperature
- an engine inlet temperature
- an engine lubricant pressure
- an engine lubricant temperature
- an engine lubricant level
- an engine coolant temperature
- an engine coolant specific gravity
- an engine exhaust gas temperature
- an engine exhaust gas content
- a transmission setting
- a brake pedal position
- a parking brake position
- a brake fluid pressure
- a fuel level
- a fuel supply pressure
- a battery voltage
- a battery charging system voltage
- a battery charging system current
- an ignition voltage
- an ignition current
- an engine cylinder compression
- a vehicle configuration, or
- a vehicle modification.

As an operational example, in preparation for performing a diagnostic procedure on a vehicle to determine if a throttle position sensor (TPS) terminal wire is shorted to the battery positive voltage source, the precondition determiner 32 may determine that the following four preconditions must be met:
- ignition switch "on"
- TPS connector disconnected
- voltmeter (VOM) red lead connected to TPS connector socket
- voltmeter (VOM) black lead connected to electrical ground The state reader 34 may then read the current state of the vehicle from a memory register, and the setting verifier 36 may determine that the ignition switch is currently "on" (valid), but that the remaining three preconditions are currently not valid. As a result, the test preparation step formatter 38 can format a graphical user interface window for display on a display device with the following test preparation steps:

Disconnect TPS

Connect VOM red lead to TPS connector socket

Connect VOM black lead to battery negative post

After completing the required test preparation steps, the vehicle technician can provide a user input by way of the input/output device, such as a keyboard, a mouse, or a stylus, to indicate that the test preparation steps have been completed. The user input can be received by the feedback receiver 40, and in response, the state updater 42 can write the new vehicle state including the three newly valid preconditions to the memory register.

Figure 3:
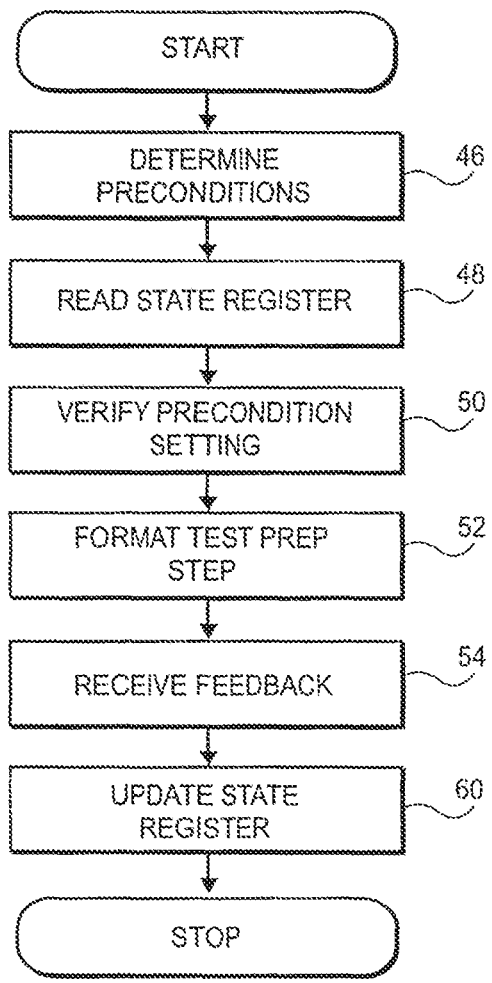
FIG. 3 is a flowchart illustrating steps that may be followed to track the state of a vehicle in accordance with one embodiment of the method or process.

FIG. 3 is a flowchart illustrating a sequence of steps that can be performed in order to track the state of a vehicle during a diagnostic test sequence. The process can begin by proceeding to step 46, "Determine Preconditions," in which a precondition or a group of preconditions required for an individual diagnostic test procedure can be determined. As described above, preconditions typically are determined for a subsequent test procedure that is to follow a current procedure that has not yet been completed, in order to avoid repetitive steps during the transition from the current diagnostic procedure to the subsequent diagnostic procedure.

Then, in step 48, "Read State Register," a vehicle state can be read, for example, from a memory register. As described above, the vehicle state can be stored in a processor register, a main memory or a peripheral storage device. After the preconditions have been determined and the current vehicle state has been read, in step 50, "Verify Precondition Setting," the current setting of the vehicle state corresponding to a specific precondition can be verified. For example, an individual bit in a memory register can be verified.

If the precondition is required for the subsequent diagnostic test procedure and the current vehicle state setting corresponding to the precondition is not valid, in step 52, "Format Test Preparation Step," a test preparation step can be formatted for display on a display device instructing the vehicle technician to satisfy the precondition, or set up the corresponding vehicle condition. Otherwise, if the precondition is not required for the subsequent diagnostic procedure and the current vehicle state setting corresponding to the precondition is valid, a test preparation step can be formatted instructing the vehicle technician to reverse the vehicle condition corresponding to the precondition.

Next, in step 54, "Receive Feedback," feedback can be received indicating either that the precondition has been satisfied or that the corresponding vehicle condition has been reversed. As described above, the feedback can be received as a data signal from the vehicle onboard computer, a test equipment signal from test equipment coupled to the vehicle, or user input.

At this point, in step 60, "Update State Register," the vehicle state setting corresponding to the precondition can be updated to indicate either that the precondition has been satisfied (valid) or that the corresponding vehicle condition has been reversed (invalid). In this way, the current and accurate state of the vehicle configuration and conditions can be maintained, for example, in a memory register. Tracking the current vehicle state by this process can facilitate efficient vehicle diagnostic testing by eliminating or minimizing duplicative efforts between diagnostic test steps in a diagnostic test sequence.

FIGS. 2 and 3 are block diagrams and flowcharts of methods, apparatuses and computer program products according to various embodiments of the present invention. It will be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus according to the present invention can include other means, such as hardware or some combination of hardware and software, including one or more processors or controllers, for performing the disclosed functions.

In this regard, FIG. 2 depicts the apparatus of one embodiment including several of the key components of a general purpose computer by which an embodiment of the present invention may be implemented. Those of ordinary skill in the art will appreciate that a computer can include many more components than those shown in FIG. 2. However, it is not necessary that all of these generally conventional components be shown in order to disclose an illustrative embodiment for practicing the invention. The general purpose computer can include a processing unit 26 and a system memory 28, which may include random access memory (RAM) and read-only memory (ROM). The computer also may include nonvolatile storage memory, such as a hard disk drive, where additional data can be stored.

An embodiment of the present invention can also include one or more input or output devices 30, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN), wide area network (WAN), the Internet, or the like, and can include all of the necessary circuitry for such a connection.

Typically, computer program instructions may be loaded onto the computer or other general purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A diagnostic tool for use with a diagnostic test sequence, comprising:
    a precondition determiner configured to determine if a precondition is required for a subsequent diagnostic test;
    a setting verifier configured to verify a current state of the precondition for the subsequent diagnostic test; and
    a preparatory step formatter configured to provide instructions to make the precondition ready if required for the subsequent diagnostic test if the precondition is not ready for the subsequent diagnostic test.

2. The diagnostic tool of claim 1, wherein the instructions are provided on a display of the diagnostic tool.

3. The diagnostic tool of claim 1 further comprising:
    a state reader configured to read the state of the precondition.

4. The diagnostic tool of claim 1 further comprising:
    a state updater configured to update a register on whether the precondition is now ready or not ready.

5. The diagnostic tool of claim 1 further comprising:
    a feedback receiver configured to receive a feedback that the precondition has been satisfied for the subsequent diagnostic test.

6. The diagnostic tool of claim 5, wherein the feedback is from a vehicle onboard computer data, a test equipment data or a user's input.

7. The diagnostic tool of claim 1, wherein the preparatory step formatter does not provide instructions if the precondition is already ready for the subsequent diagnostic test.

8. The diagnostic tool of claim 1, wherein if the precondition determiner determines that the precondition is ready but not required for the subsequent diagnostic test, then the preparatory step formatter provides a reverse step to a user to make the precondition into a not ready state.

9. A computer implemented method of tracking a state of a precondition, comprising the steps of:
    determining the precondition required for a subsequent diagnostic test, via a processor of the computer;
    determining if the required precondition is ready for the subsequent diagnostic test, via the processor; and
    providing instructions to a user to make the required precondition ready if the precondition is not ready, via the processor.

10. The computer implemented method of claim 9 further comprising the step of:
    providing instructions to the user to make the precondition not ready if the precondition is not required by the subsequent diagnostic test.

11. The computer implemented method of claim 9 further comprising the step of:
    verifying that all of the preconditions required for the subsequent diagnostic test are ready.

12. The computer implemented method of claim 11 further comprising the step of:
    updating a state register to reflect that all of the preconditions required for the subsequent diagnostic test are ready.

13. The computer implemented method of claim 11, wherein the verifying step uses information from a vehicle onboard computer data, a test equipment data or a user input.

14. A diagnostic tool, comprising:
    means for determining if a precondition is required for a subsequent diagnostic test;
    means for verifying a current state of the precondition for the subsequent diagnostic test; and
    means for instructing a user to make the precondition ready if required for the subsequent diagnostic test if the precondition is not ready for the subsequent diagnostic test.

15. The diagnostic tool of claim 14, wherein the instructions are provided on means for displaying on the diagnostic tool.

16. The diagnostic tool of claim 14 further comprising:
    means for reading the state of the precondition.

17. The diagnostic tool of claim 14 further comprising:
    means for updating a register on whether the precondition is now ready or not ready.

18. The diagnostic tool of claim 14 further comprising:
    means for receiving a feedback that the precondition has been satisfied for the subsequent diagnostic test.

19. The diagnostic tool of claim 18, wherein the feedback is from a vehicle onboard computer data, a test equipment data or a user's input.

20. The diagnostic tool of claim 14, wherein the means for instructing does not provide instructions to the user if the precondition is already ready for the subsequent diagnostic test.

21. The diagnostic tool of claim 14, wherein if the means for determining determines that the precondition is ready but not required for the subsequent diagnostic test, then the means for determining provides a reverse step to the user to make the precondition into a not ready state.

* * * * *